(12) United States Patent
Lutz

(10) Patent No.: US 8,099,856 B2
(45) Date of Patent: Jan. 24, 2012

(54) SELF-CRIMPING FILL TUBE ASSEMBLY

(75) Inventor: Mark A. Lutz, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 1060 days.

(21) Appl. No.: 12/005,871

(22) Filed: Dec. 28, 2007

(65) Prior Publication Data

US 2009/0165424 A1 Jul. 2, 2009

(51) Int. Cl.
B23P 21/00 (2006.01)
B65B 7/14 (2006.01)
(52) U.S. Cl. ............................. 29/709; 53/289
(58) Field of Classification Search .................... 29/709, 29/721, 243.523, 263, 282, 407.08, 506, 29/508, 510, 520, 33 T; 53/289, 426
See application file for complete search history.

(56) References Cited

U.S. PATENT DOCUMENTS

| | | | |
|---|---|---|---|
| 4,598,581 A | 7/1986 | Brekke | |
| 4,703,643 A | 11/1987 | Brooks et al. | |
| 5,605,360 A | 2/1997 | Kurisaki et al. | |
| 5,670,722 A | 9/1997 | Moser et al. | |
| 5,765,436 A | 6/1998 | Wilda et al. | |
| 5,895,868 A | 4/1999 | Giammaruti et al. | |
| 6,050,145 A | 4/2000 | Olson et al. | |
| 6,279,401 B1 | 8/2001 | Karas | |
| 6,295,875 B1 | 10/2001 | Frick et al. | |
| 6,510,740 B1 | 1/2003 | Behm et al. | |
| 6,539,808 B2 | 4/2003 | Saenz et al. | |
| 6,675,655 B2 | 1/2004 | Broden et al. | |
| 6,705,148 B1 | 3/2004 | McCorry et al. | |
| 6,920,795 B2 | 7/2005 | Bischoff et al. | |
| 7,036,381 B2 | 5/2006 | Broden | |
| 7,258,017 B1 | 8/2007 | Hedtke | |
| 2005/0126296 A1 | 6/2005 | Hedtke | |
| 2005/0225035 A1 | 10/2005 | Sundet | |
| 2005/0284227 A1 | 12/2005 | Broden et al. | |
| 2006/0162458 A1 | 7/2006 | Broden | |
| 2006/0162459 A1 | 7/2006 | Broden | |

OTHER PUBLICATIONS

Official Search Report and Written Opinion of the Patent Cooperation Treaty in counterpart foreign Application No. PCT/US08/13756, filed Dec. 16, 2008.

*Primary Examiner* — John C Hong
(74) *Attorney, Agent, or Firm* — Kinney & Lange, P.A.

(57) ABSTRACT

A crimping system for a fill tube of an industrial process transmitter system comprises a collar, a fill tube and crimp jaws. The collar comprises a passageway for receiving the fill tube, and a seat surrounding the passageway. The fill tube extends through the passageway and seat of the collar. The crimp jaws are positioned within the seat to surround the fill tube, and are inserted into the seat to crimp the fill tube.

18 Claims, 6 Drawing Sheets

8,099,856 B2

SELF-CRIMPING FILL TUBE ASSEMBLY

BACKGROUND

This invention relates generally to process instruments used in industrial process control systems. More particularly, the present invention relates to self-crimping fill tube assemblies for use in pressure transmitter systems.

Process instruments are used to monitor process parameters, such as pressure, temperature, flow and level, of fluids used in a variety of industrial processes. For example, process transmitters are used to measure various process fluid parameters situated throughout production facilities such that they can be monitored from a central location. Process transmitters include sensor modules that produce an electrical output in response to physical changes in the process parameter. For example, pressure transmitters may include a capacitive pressure transducer or a piezoresistive pressure transducer that produces an electrical output as a function of the pressure of a process fluid. Output of the sensor module is processed by the transmitter's circuitry such that the sensed parameter can be monitored locally at the transmitter or remotely from a control room. Typically, the pressure of the process fluid is transmitted to the sensor through a closed hydraulic passageway that is in contact with the process fluid through a flexible isolation diaphragm at a first end and a sensor diaphragm at a second end. The accuracy of the output of the pressure transmitter depends on the ability of the closed hydraulic system to convey the magnitude of the process fluid pressure to the sensor module. Typically, the passageway is filled with a precise level of fill fluid that conveys the process fluid pressure from the isolation diaphragm to the sensor diaphragm. In other pressure transmitter systems, remote seal systems serve as extensions of the passageway and comprise a capillary tube having an additional fill fluid. As the pressure of the process fluid fluctuates, the remote seal's fill fluid in series with the transmitter's fill fluid transmits the pressure from the remote seal's isolation diaphragm to the sensor diaphragm, causing the sensor module to alter its electrical output.

The fill fluid passageways in both sensor modules and remote seal systems are filled and sealed during assembly with a precise amount of fill fluid to ensure that the pressure is accurately transmitted from the process fluid to the sensor module. In one method, a fill tube through which the fill fluid is injected into the sensor module extends into the sensor module or remote seal system. After the proper amount of fill fluid is injected, the fill tube can be crimped and welded shut to prevent any fill fluid leakage. The crimp, however, has a tendency to spring-back before the weld takes hold, thus allowing a small amount of fill fluid to escape. The leakage not only reduces the volume of the fill fluid, but contaminates the weld joint, thus making welding difficult and the weld prone to blow-hole formation. Furthermore, in order to perform the crimping and welding procedures, the fill tube must extend from the sensor module or remote seal system an undesirable length that leaves a portion of the fill tube vulnerable to damage. Additionally, crimped and welded fill tubes include no back-up or secondary sealing means, meaning a failure of the weld causes the pressure transmitter to fail to perform. There is, therefore, a need for a crimping assembly that prevents leakage in a more compact and dependable manner.

SUMMARY

The present invention is directed toward a crimping system for a fill tube of an industrial process transmitter system. The crimping system comprises a collar, a fill tube and crimp jaws. The collar comprises a passageway for receiving the fill tube, and a seat surrounding the passageway. The fill tube extends through the passageway and seat of the collar. The crimp jaws are positioned within the seat to surround the fill tube, and are inserted into the seat to crimp the fill tube.

DETAILED DESCRIPTION

Figure 1:
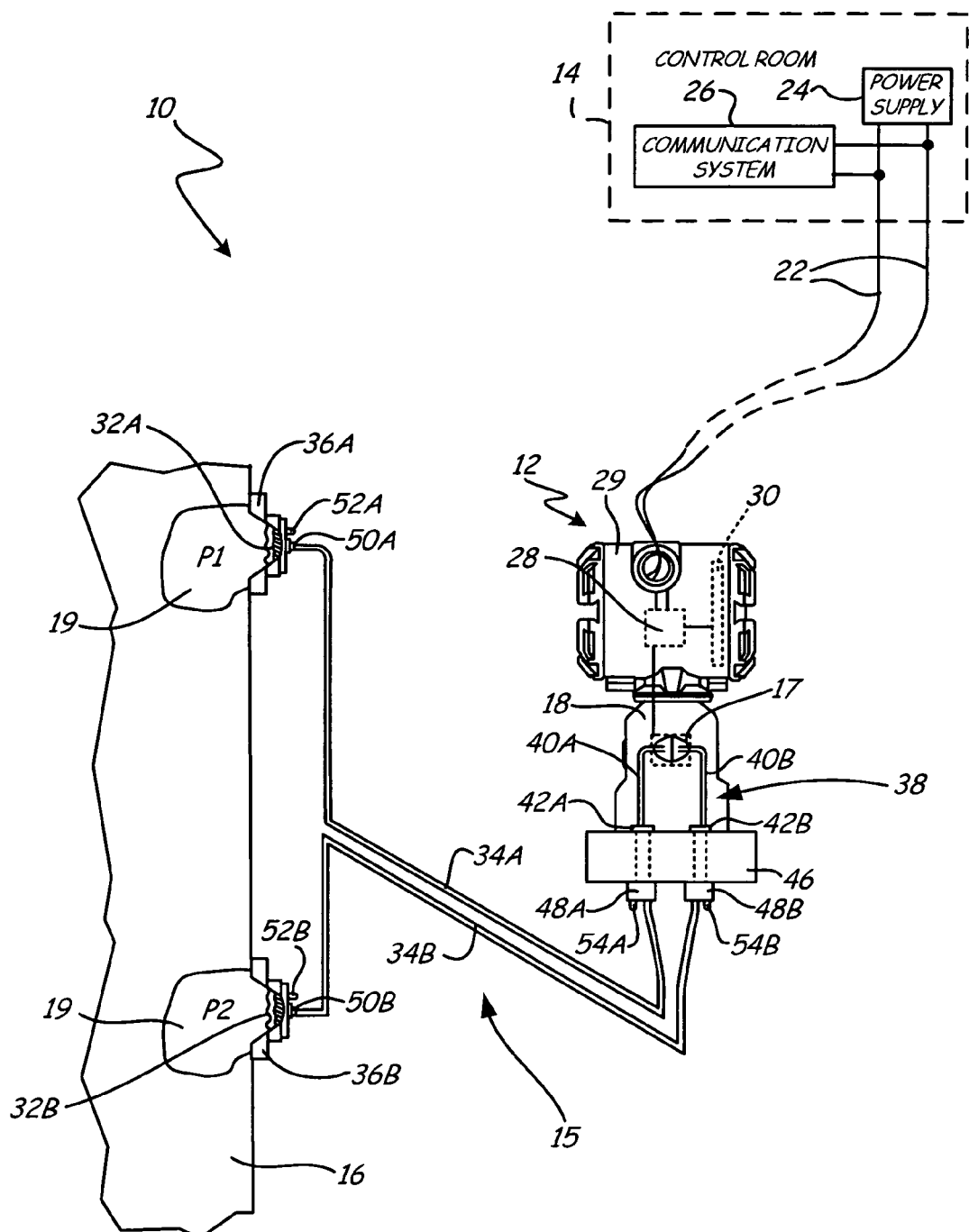
FIG. 1 shows a process control system having a pressure transmitter and remote seal using self-crimping fill tube assemblies of the present invention.

FIG. 1 shows process control system 10, which includes pressure transmitter 12, control room 14, remote seal system 15 and process vessel 16. Pressure transmitter 12 includes pressure sensor 17, which is disposed in sensor module 18, for sensing the pressure level of process fluid 19 contained in process vessel; 16 through remote seal system 15. Transmitter 12 then relays the pressure to control room 14 over control loop 22. Control room 14 also supplies power to transmitter 12 from power supply 24 over control loop 22. Control loop 22 also enables communication system 26 to transmit data from control room 14 to transmitter 12, and to receive data from transmitter 12. Pressure transmitter 12 includes transmitter circuitry 28, which is disposed within transmitter housing 29, for transmitting electrical signals generated by the pressure sensor over control loop 22 to control room 14 or a local display, or both. In one embodiment, pressure transmitter 12 is a two-wire transmitter for operating on a 4-20 mA loop. In one embodiment, control loop 22 and communication system 26 operate over a digital network protocol such as Fieldbus, Profibus, ControlNet, P-Net, SwiftNet, WorldFIP or Interbus-S. In other embodiments, pressure transmitter 12 includes means for locally monitoring the pressure, such as through LCD display 30 or a handheld reader device (not shown). In still other embodiments, control loop 22 does not comprise wires, but communicates over a wireless network. In such embodiments, transmitter 12 includes wireless communication circuitry and other means for receiving power from power supply 24 or another source. Based on the processed pressure signal received from sensor 17 and transmitter 12, control room 14 is able to adjust process parameters either through control loop 22 or another control loop. For example, control room 14 can adjust the flow of process fluid 19 to vessel 16 by adjusting appropriate valves.

In order to transmit the pressure of process fluid 19 to pressure sensor 17, transmitter 12 is configured with hydraulic relay system 38 and connected with remote seal system 15. Remote seal system 15 includes remote seal isolation diaphragms 32A and 32B, capillaries 34A and 34B and remote seals 36A and 36B. Relay system 38 includes passageways 40A and 40B that are coupled with isolation diaphragms 42A and 42B in transmitter 12 at their first ends and sensor 17 at their second ends. Passageways 40A and 40B are supplied with a first fill fluid that is comprised of a first hydraulic fluid. Capillaries 34A and 34B are connected to isolation diaphragms 42A and 42B, respectively, through flange 46, which in one embodiment comprises a COPLANAR® flange. Capillaries 34A and 34B extend from flange 46 to diaphragms 32A and 32B of remote seals 36A and 36B where contact is made with process fluid 19 of vessel 16. Capillaries 34A and 34B are filled with a second fill fluid comprising a second hydraulic fluid. The second hydraulic fluid transmits the pressure of process fluid 19 from vessel 16 to isolation diaphragms 42A and 42B of transmitter 12, while the first hydraulic fluid transmits the pressure of process fluid 19 to sensor 17 through relay system 38. Process fluid 19 exerts pressure P1 on isolation diaphragm 32A such that isolation diaphragm 32A deflects within remote seal 36A. The second hydraulic fluid then transmits pressure P1 through capillary 34A to sensor diaphragm 42A of relay system 38, whereupon pressure P1 is further relayed to sensor 17.

Passageways 40A and 40B and capillaries 34A and 34B are filled with a precise level of fill fluid so that pressures P1 and P2 are accurately transmitted to sensor 17. Capillaries 34A and 34B are connected to flange 46 with connectors 48A and 48B, and are connected to remote seals 36A and 36B with connectors 50A and 50B. Capillaries 34A and 34B are filled and sealed, typically during manufacture, using self-crimping fill tube assemblies 52A, 52B, 54A and 54B of the present invention. Self-crimping fill tube assembly 52A and self-crimping fill tube assembly 54A provide redundant means for charging capillary 34A with a fill fluid between isolation diaphragm 32A and sensor diaphragm 42A. Self-crimping fill tube assemblies 52A and 54A both provide an access point into capillary 34A that, after filling with the proper amount of the second fill fluid, can be crimped shut to prevent spring-back of capillary 34A, which prevents air from entering capillary 34A and prevents leakage of the second fill fluid from capillary 34A. Self-crimping fill tube assemblies 52A through 54B are similar in construction, the particular details of which are discussed in FIGS. 2-8 with respect to self-crimping fill tube assembly 52A.

Figure 2:
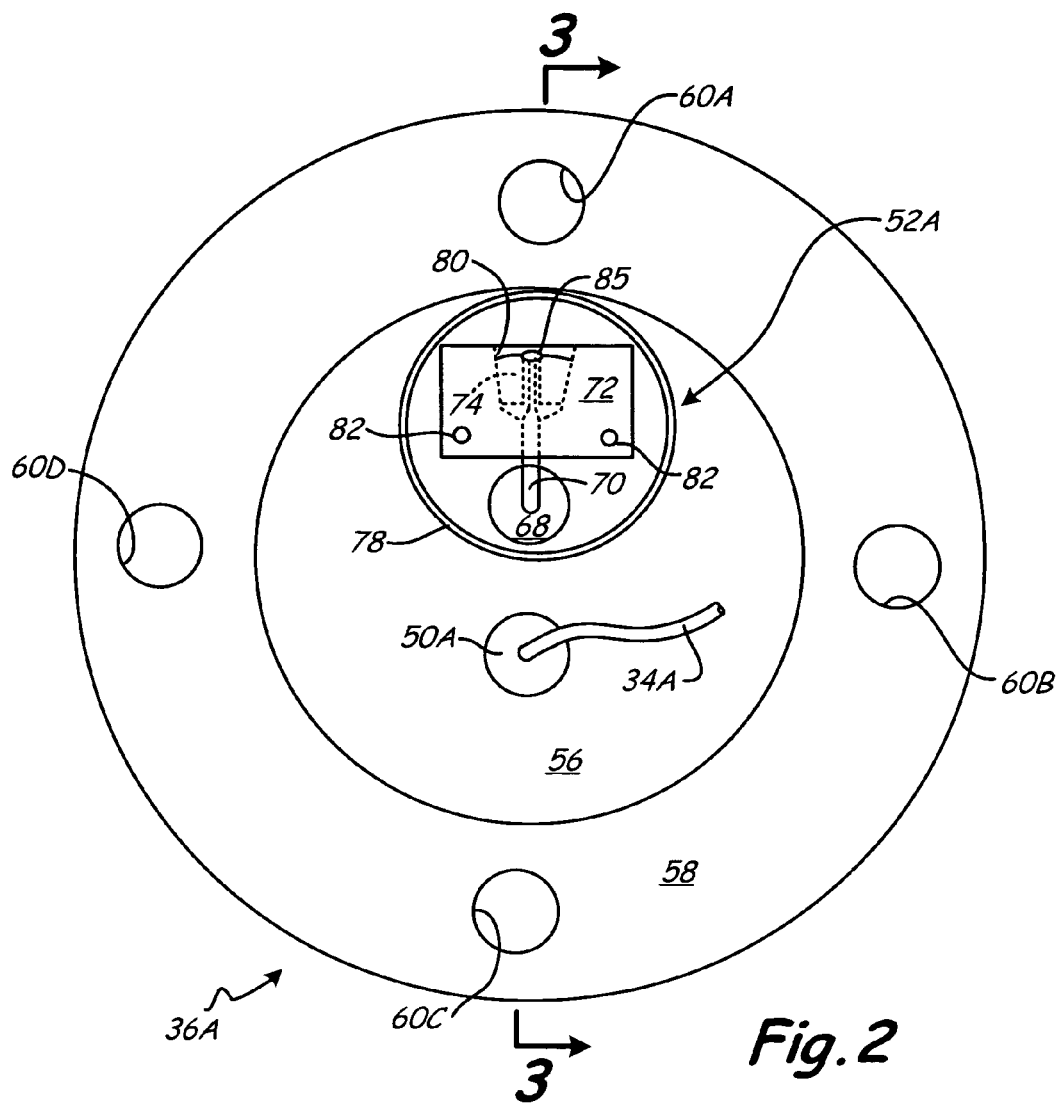
FIG. 2 shows a front view of the remote seal of FIG. 1 having a direct mount remote seal adapter with a self-crimping fill tube assembly of the present invention.
Figure 3:
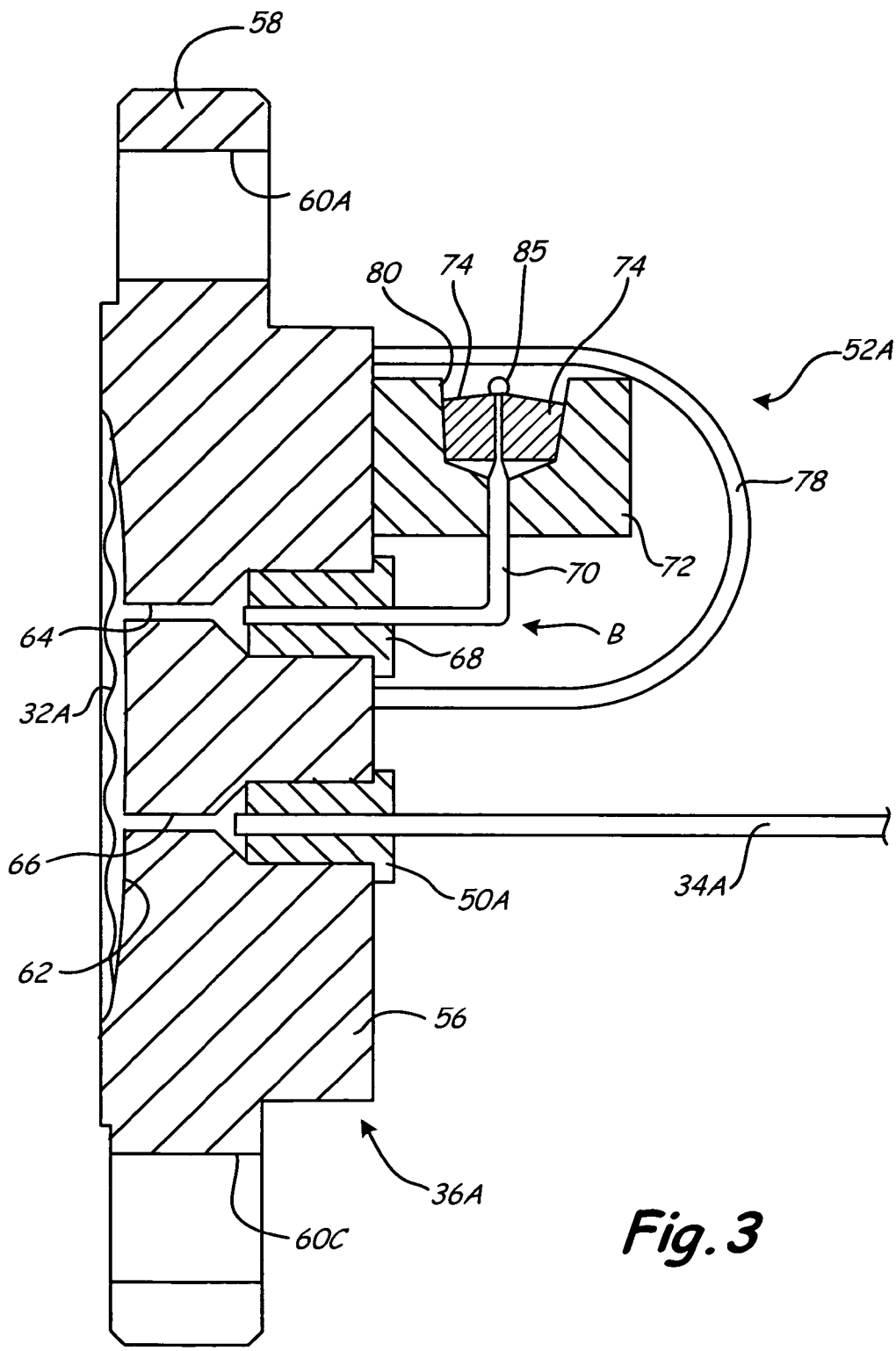
FIG. 3 shows a cross-section of the remote seal of FIG. 2 taken at section 3-3, in which a crimp block and a crimping jaw pair of the self-crimping fill tube assembly of the present invention are seen.

According to one embodiment, FIG. 2 shows a front view of remote seal 36A connected with capillary 34A using connector 50A and self-crimping fill tube assembly 52A. FIG. 3 shows a cross-section of remote seal 36A taken at section 3-3 of FIG. 2 and is discussed concurrently with FIG. 2. Remote seal 36A includes disk 56, flange 58, mounting bores 60A-60D, diaphragm recess 62 and fill bores 64 and 66. Self-crimping fill tube assembly 52A comprises bushing 68, fill tube 70, crimp block 72, crimp jaws 74, and dome 78.

Remote seal 36A comprises circular disk 56 that includes flange 58 for mounting to a process fluid source such as vessel 16. Flange 58 includes mounting bores 60A-60D, which are used in conjunction with threaded fasteners to join remote seal 36 with vessel 16. Remote seal 36A is positioned at an opening on vessel 16 such that isolation diaphragm 32A is in contact with process fluid 19. Disk 56 comprises a platform on which to mount isolation diaphragm 32A, connector 50A and self-crimping fill tube assembly 52A. Disk 56 includes diaphragm recess 62 and fill bores 64 and 66, and as such comprises a typical remote seal housing that is used with, for example, a direct mount remote seal system. Diaphragm recess 62 provides a frame into which isolation diaphragm 32A is stretched and mounted, typically with a welding process, such that isolation diaphragm 32A separates process fluid 19 and the second fill fluid within remote seal 36A. Isolation diaphragm 32A comprises a flexible membrane that transmits the pressure from process fluid 19 through to the second fill fluid. The second fill fluid enters diaphragm recess 62 though fill bores 64 and 66. The second fill fluid can be initially provided to diaphragm recess 62 through self-crimping fill tube assembly 52A and fill bore 64, then, after flowing through diaphragm recess 62, enters capillary 34A through fill bore 66. Alternatively, the second fill fluid can be provided from self-crimping fill tube assembly 54A (FIG. 1) at transmitter 12.

Connector 50A comprises a bushing that is fit into an end of fill bore 66 having a similar diameter. Typically, connector 50A is welded into fill bore 66 such that a tight, leak-proof connection is formed. Connector 50A includes a central bore for receiving capillary 34A. Capillary 34A is inserted through the central bore of connector 50A such that it extends from diaphragm recess 62 to connector 48A at transmitter 12 (FIG. 1). Capillary 34A is connected with connector 50A in any suitable manner such that a leak-proof, contaminant-free connection is made. For example, capillary 34A is compression fit inside connector 52A as connector 52A is force fit into fill bore 66. In other embodiments, capillary 34A is welded to connector 50A. Additionally, capillary 34A is typically encased in within a stainless steel sleeve (not shown) between connector 50A and flange 46 for protection.

Self-crimping fill tube assembly 52A permits a precise amount of the second hydraulic fill fluid to be introduced into capillary 34A through fill tube 70, which can be subsequently sealed-off at the pressure required to transmit pressure P1 from vessel 16 to hydraulic relay system 38 of transmitter 12 (FIG. 1). Self-crimping fill tube assembly 52A includes bushing 68, which functions similar to that of connector 50A to join fill tube 70 with disk 56. A first end of fill tube 70 is connected with bushing 68 such that the second hydraulic fill fluid is able to enter capillary 34A through diaphragm recess 62. A second end of fill tube 70 extends into crimp block 72 and through seat 80. Crimp block 72 comprises a platform upon which crimp jaws 74 can be brought into a fixed relationship with fill tube 70 to seal the second fill fluid within capillary 34A and diaphragm recess 62. Crimp block 72 is affixed to disk 56 of remote seal 36A with, for example, threaded fasteners extending through bores 82 such that crimp jaws 74 can be firmly pushed into seat 80 to crimp fill tube 70.

Figure 4:
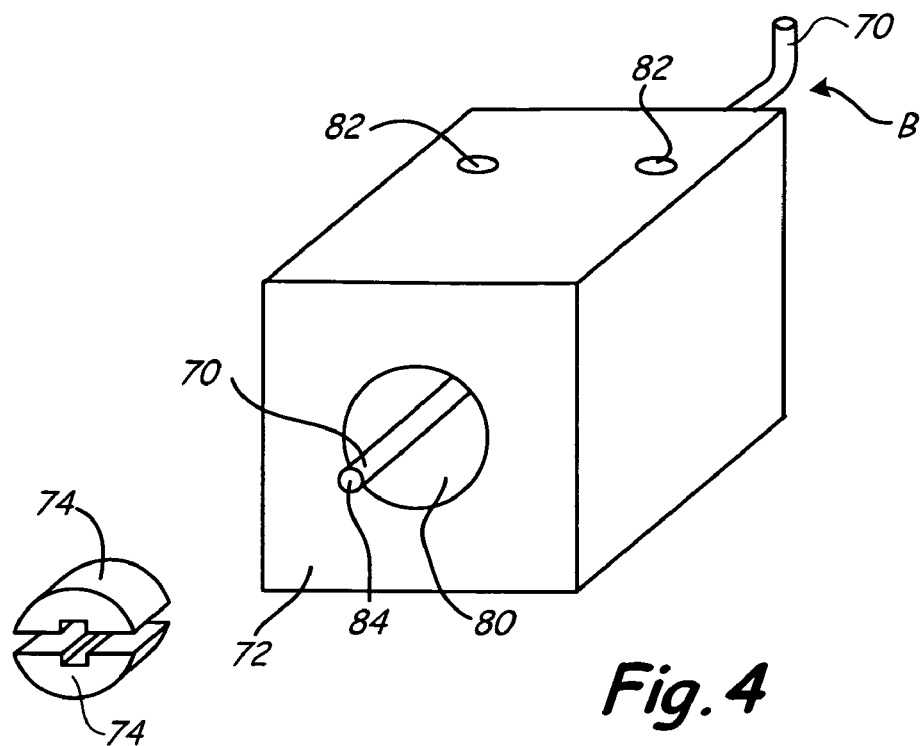
FIG. 4 shows an exploded perspective view of the crimp block and crimping jaw pair used in the remote seal of FIGS. 2 and 3.

As seen in FIG. 4, fill tube 70 extends completely through crimp block 72 and seat 80 prior to being crimped by jaws 74. Thus, fill tube 70 includes an un-constricted opening into diaphragm recess 62 (FIG. 3) and the second fill fluid can be introduced into fill tube 70 at inlet 84 with, for example, a pressurized injection system. The second fill fluid, as well as the first fill fluid, comprises any suitable incompressible hydraulic fluid that is known in the art, such as glycerin and water or propylene glycol. In various embodiments, the second fill fluid is comprised of DC 200®, DC 704® or Syltherm XLT® silicone oil as are commercially available from Dow Corning Corporation, Midland, Mich., USA. The injection system dispenses the second fill fluid to fill tube 70, diaphragm recess 62, and capillary 34A to the desired pressure. The injection system is used to hold the pressure within capillary 34A constant at the desired level until crimp jaws 74 of self-crimping fill tube assembly 52A are fitted within seat 80 and seated with a crimping tool. Seat 80 comprises a conically shaped bore within block 72. Crimp jaws 74 fit together to form a plug for seat 80 that has an outer diameter matching the shape of seat 80. When fit together, crimp jaws 74 form a channel that fits around fill tube 70. The channel is, however, only wide enough to accommodate the wall thickness of fill tube 70, not the hollow interior space. Thus, with fill tube 70 extending from block 72 and into seat 80, crimp jaws 74 are pressed into seat 80 so that their outer diameter walls slide along conically shaped seat 80. As crimp jaws 74 slide down into seat 80, they pinch off fill tube 70, thus locking the internal pressure of capillary 34A, at which point the injection system can be removed from inlet 84. The portion of fill tube 70 comprising inlet 84 can thereafter be broken off or otherwise removed at crimp jaws 74. Thus, self-crimping fill tube assembly 52A provides a crimping means that is preferably flush with or recessed within the outer surface of block 72. As such, the crimped portion of the fill tube is protected by crimp block 72.

Returning to FIG. 3, self-crimping fill tube assembly 52A includes crimp jaws 74, which are positioned inside seat 80 to close off fill tube 70. Crimp jaws 74 provide a first means for sealing fill tube 70. Crimp jaws 74 are forcibly pushed into seat 80 to seal fill tube 70. Thus, crimp jaws 74 are secured within seat 80 by a press fit or force fit. The press fit provides enough force to hold crimp jaws 74 in place around fill tube 70. Further means for sealing crimp jaws 74 around fill tube 70 is provided by placing various welds along crimp jaws 74. For example, welds can be placed along seat 80 by jaws 74 to prevent jaws 74 from retreating from seat 80. Also, fill tube 70 can be welded at location 85 to provide a backup seal to the crimp seal of fill tube 70. The weld at location 85 prevents fill tube 70 from reopening and prevents any contaminants from entering fill tube 70.

Self-crimping fill tube assemblies of the present invention can be adapted to apply to various pressure transmitter system components. For example, as indicated with reference to FIG. 1, transmitter 12 includes self-crimping fill tube assemblies 54A and 54B. Self-crimping fill tube assemblies 54A and 54B include crimp blocks that can be mounted to flange 46, similar to how crimp block 72 of self-crimping fill tube assembly 52A is mounted to remote seal 36A. Thus, crimp block 72 provides a mechanical structure for use with crimp jaws 74 and that can be mounted to a variety of components with bores 82.

Crimp block 72 is also made of a material suitable for functioning with self-crimping fill tube assembly 52A. Crimp block 72 must be made of a material having enough strength to withstand the forces imparted by crimp jaws 74. In one embodiment, crimp block 72 is comprised of high strength alloy such as steel, and crimp jaws 74 are comprised of 316 stainless steel. As such crimp jaws 74 can be pushed down into seat 80 without causing crimp block 72 to yield. In one embodiment, crimp jaws 74 and crimp block 72 can be comprised of materials having greater yield strengths than that of fill tube 70. Crimp jaws 74 and crimp block 72 are comprised of materials that are resistant to corrosion. In other embodiments, however, crimp jaws 74 and crimp block 72 can be made of any suitable materials having compatible yield strengths and corrosion properties. In order to further reduce the risk of corrosion between crimp block 72, crimp jaws 74 and fill tube 70, self-crimping fill tube assembly 52A is provided with dome 78 to isolate assembly 52A from the environment in which remote seal assembly 15 operates. For example, in some embodiments of the invention, fill tube 70 and crimp jaws 74 are typically comprised of various alloys such as steels and as such are at risk for galvanic corrosion due to the various types of environments in which remote seal assembly 15 is used. Dome 78 isolates crimp block 72 and crimp jaws 74 from those operating environments to reduce the potential for galvanic corrosion and other damage. Dome 78 can be attached to crimp block 72 in any suitable fashion including by welding or by a threaded engagement.

Crimp block 72 further provides a portable and adaptable platform for the self-crimping fill tube assemblies of the present invention by providing a sturdy platform in which to press crimp jaws 74. As indicated earlier, a downward force is needed in order to obtain the crimping achieved by crimp jaws 74. The downward force is also translated to fill tube 70, causing a downward movement of fill tube 70 within seat 80. Crimp block 72 is mounted to disk 56 of remote seal 32A such that fill tube 70 includes bend B to reduce the downward effects on fill tube 70 imparted by the force necessary to crush fill tube 70. Bend B transforms downward movement of fill tube 70 into sideways bending during the crimping process. The specific degree of bending in inlet 84 varies and depends on design considerations. Fill tube 70 needs to extend between bushing 68 and seat 80 of crimp block 72. Crimp block 72 typically comprises a quadrangular block such that the main axis of seat 80 is generally perpendicular to fill bore 64 and, as such, bend B comprises an approximately ninety-degree re-direction of fluid inlet 84. Thus, top and bottom surfaces of crimp block are exposed, which provides access to both seat 80 and fill bore 64, and permits a crimping tool to be easily used with self-crimping fill tube assembly 52.

Figure 5A:
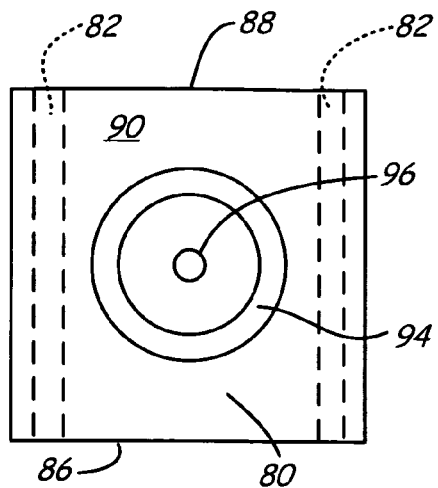
FIG. 5A shows a front view of the crimp block of FIGS. 2 and 3.
Figure 5B:
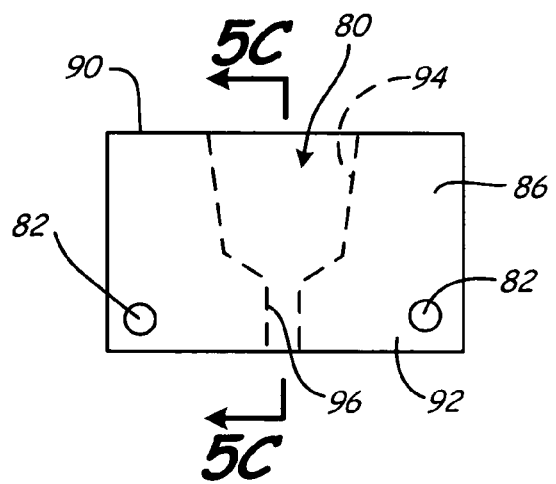
FIG. 5B shows a side view of the crimp block of FIGS. 2 and 3.
Figure 5C:
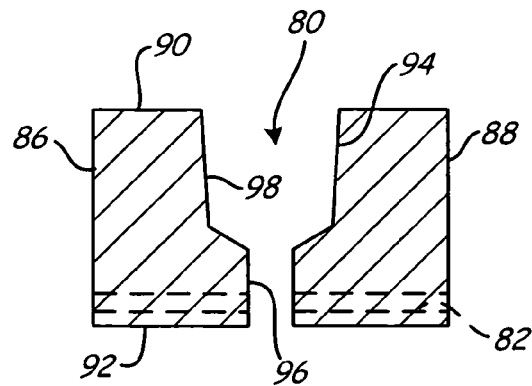
FIG. 5C shows a cross section of the crimp block of FIGS. 2 and 3 as taken at section 5C-5C of FIG. 5B.

FIGS. 5A-5C show various view of one embodiment of crimp block 72 shown in FIGS. 2 and 3. FIG. 5A shows a front view of crimp block 72 and FIG. 5B shows a side view of crimp block 72. FIG. 5C shows a cross section of crimp block 72 taken at section 5C-5C of FIG. 5B. Crimp block 72 includes seat 80, mounting bores 82 front face 86, rear face 88, top surface 90 and bottom surface 92. Crimp block 72 generally comprises a quadrangular body providing six flat surfaces such that crimp block 72 can be easily mounted when installed and gripped during assembly of crimp jaws 74. Mounting bores 82 extend from front face 86 through to rear face 88 of block 72 such that block 72 can be easily mounted to a process transmitter components, such as disk 56 (FIG. 2) of remote seal 36A or flange 46 (FIG. 1) of transmitter 12, with, for example, threaded fasteners. In the embodiment shown, front face 86 and rear face 88 comprise flat, rectangular surfaces such that block 72 can be mounted flush to a mating flat surface. Furthermore, in one embodiment, top surface 90 and bottom surface 92 provide generally planar, parallel ledges that can be used to grip block 72 to assembly crimp jaws 74 after rear face 88 is attached to remote seal 32. For example, a crimping tool can grip block 72 at top and bottom surfaces 90 and 92 such that crimp jaws 74 can be pushed into seat 80 with the required force without stressing the connections at bores 82. In other embodiments of the invention, crimp block 72 could be fitted into an opening or recess within other components of process transmitter system 10. For example, in various embodiments, crimp block 74 comprises a cylindrical shaped body to facilitate press-fitting into various process openings, such as bores within flange 46 (FIG. 1) or fill bores 64 and 66 of remote seal 36A (FIG. 3). In yet other embodiment, crimp block 74 can be integrated directly into flange 46 or remote seal 36A such as by a machining process. Thus, the various embodiments of crimp block 74 permit the self-crimping fill tube assemblies of the present invention to be easily integrated into a variety of process control components with little or no modifications.

Seat 80 extends from top surface 90 through to bottom surface 92 such that a channel is provided through crimp block 72 to receive fill tube 70, as seen in FIGS. 3, 4 and 5. Seat 80 comprises a conical upper portion 94 and a cylindrical lower portion 96. Lower portion 96 is sized to receive fill tube 70 and thus has an inner diameter slightly larger than the outer diameter of fill tube 70. In one embodiment, lower portion 96 is sized such that fill tube 70 is interference-fit into lower portion 96. As such, lower portion 96 provides some structural stability to fill tube 70 as fill tube 70 extends from bushing 68. Upper portion 94 includes inward sloping walls shaped to receive crimp jaws 74. Upper portion 94 has a sloping inner diameter that is larger than lower portion 96. The diameter of upper portion 94 decreases in size as upper portion 94 extends from top surface 90 to lower portion 96. As such, crimp jaws 74 are slid down into seat 80 until they become lodged within upper portion 94 (See FIG. 3). A layer of low friction material 98 may also be provided along seat 80 to facilitate insertion of crimp jaws 74 into seat 80. For example, in one embodiment, seat 80 is plated with a silver coating. Silver provides a ductile, low-friction material that facilitates assembly. Crimp block 72 thus comprises a collar that retains crimp jaws 74 around fill tube 70.

Figure 6:
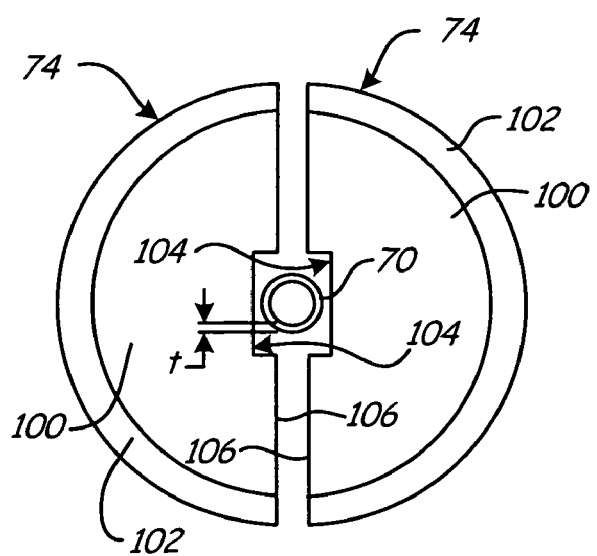
FIG. 6 shows a bottom view of the crimp jaw pair of FIGS. 2 and 3.

According to one embodiment, FIG. 6 shows a bottom view of crimp jaws 74 of self-crimping fill tube assembly 52A (FIG. 3) surrounding un-crimped fill tube 70. Crimp jaws 74 include bottom surfaces 100 and conically shaped side walls 102, interior channels 104 and inner surfaces 106. Side walls 102 are shaped such that they will slide parallel along seat 80 and are locked in place via a force fit. In one embodiment, interior channels 104 have a generally rectangular cross section and are aligned to surround fill tube 70. Fill tube 70 comprises a thin metal tube having approximately uniform wall thickness t. Fill fluid is introduced into diaphragm recess 62 (FIG. 3) through un-crimped fill tube 70, as is shown in FIG. 4. Crimp jaws 74 are pushed down into seat 80 to crush fill tube 70 and to seal off fill diaphragm recess 62, as shown in FIG. 3. When crimp jaws 74 are fully inserted into seat 80, interior channels 104 meet to crush fill tube 70. Thus, fill tube 70 deforms to nearly fill channels 104, thus inhibiting the ability of fill fluid to enter or leave fill tube 70. Similarly, crimp jaws 74 fill in seat 80, but for channels 104.

Crimp jaws 74 are pushed within seat 80 while encompassing fill tube 70. Crimp jaws 74 have an outer diameter that matches the inner diameter of seat 80. Inner surfaces 106 abut together such that channels 104 form a channel that surrounds fill tube 70 and that has a width that is approximately equal to twice wall thickness t of fill tube 70. As crimp jaws 74 are pushed into seat 80, channels 104 push in on the hollow structure of fill tube 70, pushing the walls of fill tube up against each other to flatten fill tube 70. The widths of channels 104 are wide enough to accommodate the flattening out of fill tube 70. As can be seen in FIG. 3, fill tube 70 is crushed such that it is no longer a hollow body. Fill tube 70 collapses in on itself such that its outer wall is pressed up against itself within the channel formed between crimp jaws 74. Crushed fill tube 70 fills channels 104 such that fill tube 70 has no room to expand or to spring back to its original shape, avoiding the potential for any leakage of the second hydraulic fill fluid. Thus, backup sealing of fill tube 70 by welding is more readily accomplished and performance of transmitter 12 is not compromised. Channels 104 are shaped such that they pinch, crush or otherwise close off fill tube 70, but that they don't pierce or sever fill tube 70. The specific dimensions of crimp jaws 74 can be adjusted and customized depending on design requirements. For example, larger diameter fill tubes with thicker walls will require channels 104 to be wider and deeper. Also, the specific shape of side walls 106 and interior channels 104 can be adjusted, and other features added, to meet specific design needs.

Figure 7:
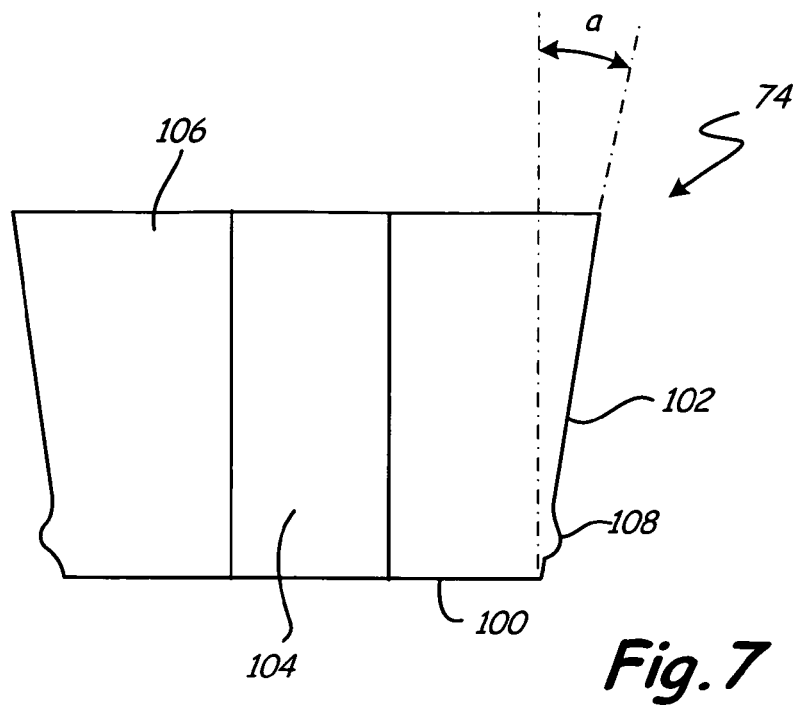
FIG. 7 shows a front view of a crimp jaw of FIGS. 2 and 3.

FIG. 7 shows a front view of the interior surface of crimp jaw 74 of FIG. 6 in which interior channel 104 is seen. Crimp jaw 74 also includes bottom surface 100, side wall 102 and inner surface 106. Side wall 102 extends out from bottom surface 100 of crimp jaw 74 at angle α with respect to an axis perpendicular to bottom surface 100. Thus, an assembled pair of crimp jaws 74 comprises a generally conically shaped body matched to fit seat 80. In one embodiment, angle α is approximately ten degrees. The magnitude of angle α contributes to the strength of the force fit between seat 80 and crimp jaws 74. Shallower angles will provide more holding force, such as may be required for larger fill tubes, but require greater force to insert crimp jaws 74 into seat 80. Additionally, a layer of low friction material may also be provided along side wall 102 of crimp jaws 74 to facilitate sliding of crimp jaws 74 along seat 80. For example, in one embodiment, side walls 102 are plated with a silver coating, which provides a ductile, low-friction material that facilitates assembly, yet is also resistant to corrosion. In other embodiments of the invention, side walls 102 have other shapes. For example, side walls 102 include protrusion 108 to mate with a corresponding notch or contour on seat 80. Thus, the mating notch and protrusion would lock the crimp jaws into place and give a tactile indication that the crimp jaws are fully seated. Likewise, interior channel 104 may include features to assist in crimping fill tube 70 when a pair of crimp jaws 74 engages each other.

Figure 8:
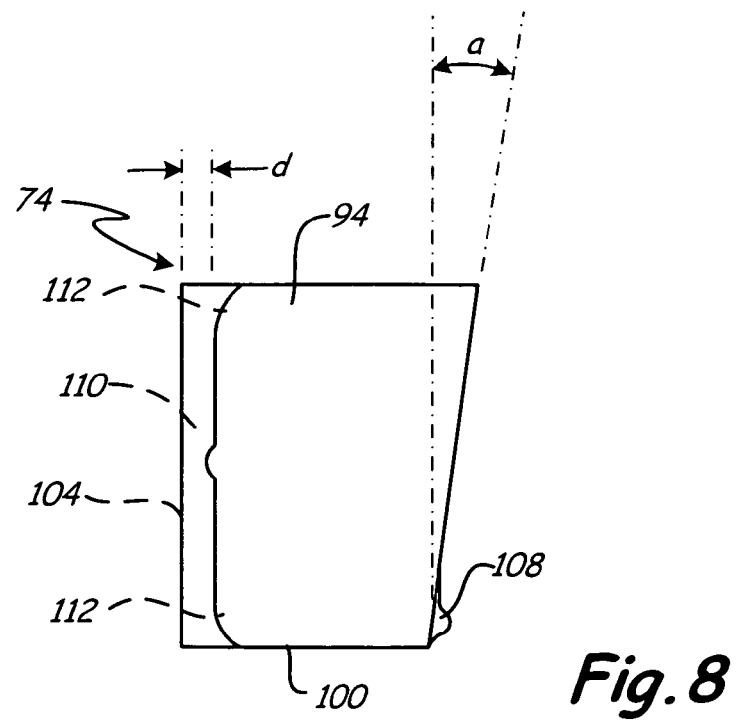
FIG. 8 shows a side view of a crimp jaw of FIGS. 2 and 3.

FIG. 8 shows one embodiment of crimp jaw 74 having interior channel 104 with crimp bulge 110 and flared ends 112. Crimping a fill tube with conventional crimping means, however, generally results in the fill tube having a "dog bone" shape, if viewed at an end of the crimped tube. A dog bone shaped crimped fill tube has a completely crushed or crimped center portion where the walls of the fill tube are collapsed against each other. Thus, the fill tube is completely closed off as the force required to collapse the tube is easily overcome. At the outer edges of the crimped fill tube, the walls of the fill tube themselves are crushed and compressed, which tends to result in the ends of the crimp remaining slightly open. Crimp bulge 110 and flared ends 112 of crimp jaws 74 of the present invention overcome the problems associated with dog bone shaped crimps by providing interior channel 104 with shaped features that distribute the crimping force across the width of crimped fill tube 70.

As seen in FIGS. 6 and 7, interior channel 104 comprises a generally rectangular channel that extends into interior surface 106 of crimp jaw 74 in a direction generally perpendicularly to bottom surface 100. Thus, depth d of interior channel is selected to be approximately slightly less than the wall thickness t of fill tube 70. When fill tube 70 is crushed between interior channels 104, the walls of fill tube 70 will be put into compression with each other, but will not be cut off or pinched off. Crimp bulge 110 deforms fill tube 70 to further compress its walls against each other. Crimp bulge 110 is, however, rounded so as to not induce edges into or to pierce or otherwise compromise fill tube 70. Crimp bulge 110 extends across the width of interior channel 104 to ensure the center portion and end portions of fill tube 70 are completely closed of between crimp jaws 74. In other embodiments, interior channel 104 is sloped with respect to the interior surface 106 of crimp jaws 74 such that a V shaped channel surrounds fill tube 70 and the compression of the walls of fill tube 70 varies along the length of channel 104 to avoid producing a puncture of fill tube 70. In order to further alleviate stress points, interior channel 104 may include flared ends 112. Flared ends 112 provide a rounded or sloping transition between the crimped and non-crimped portions of fill tube 70, thus avoiding damaging of fill tube 70 during crimping.

Although the present invention has been described with reference to preferred embodiments, workers skilled in the art will recognize that changes may be made in form and detail without departing from the spirit and scope of the invention.

The invention claimed is:

1. A crimping system for a fill tube of an industrial process transmitter system, the crimping system comprising:
   a collar comprising:
      a passageway for receiving a fill tube; and
      a seat surrounding the passageway;
   a fill tube extending through the passageway and seat of the collar; and
   crimp jaws surrounding the fill tube and inserted into and disposed within the seat to crimp the fill tube closed.

2. The crimping system of claim 1 wherein:
   the seat includes a conically shaped inner diameter; and
   the plurality of crimp jaws collectively comprise a conically shaped outer diameter matching that of the seat.

3. The crimping system of claim 2 wherein the conically shaped outer diameter of the collective crimp jaws includes a surface contour.

4. The crimping system of claim 1 wherein the plurality of crimp jaws comprises a first crimp jaw and a second crimp jaw.

5. The crimping system of claim 4 wherein:
   the first crimp jaw includes a first inner diameter channel; and
   the second crimp jaw includes a second inner diameter channel; and
   wherein the fill tube is crushed between the first and second inner diameter channels such that flattened walls of the fill tube are pushed against each other.

6. The crimping system of claim 5 wherein the first and second inner diameter channels form a slot having a thickness corresponding to approximately twice a thickness of a wall of the fill tube.

7. The crimping system of claim 5 wherein the first and second inner diameter channels form a rectangular shaped channel having flared ends.

8. The crimping system of claim 5 wherein the first and second inner diameter channels form a slot having a crimping bulge for imparting compression into the flattened walls of the fill tube that are pushed against each other.

9. The crimping system of claim 1 wherein the plurality of crimping jaws are rigidly fixed to the collar after insertion into the seat.

10. The crimping system of claim 1 wherein the plurality of crimp jaws is recessed within the seat below a top surface of the collar.

11. The crimping system of claim 10 and further comprising a dome positioned over the plurality of crimping jaws and the collar.

12. The crimping system of claim 1 and further comprising a bushing connected to an end of the fill tube.

13. The crimping system of claim 1 wherein the fill tube includes a bend on one side of the passageway.

14. The crimping system of claim 1 wherein the collar includes a plurality of mounting bores extending through the collar generally perpendicular to the passageway.

15. The crimping system of claim 1 wherein each of the crimp jaws further includes a plating of low friction material.

16. The crimping system of claim 1 wherein an end of the fill tube crimped with the crimp jaws is sealed with a weld.

17. The crimping system of claim 1 and further comprising:
   a sensor for measuring a pressure of an industrial process fluid and generating a sensor signal that is a function of the measured pressure;
   transmitter electronics connected to the sensor for conditioning the sensor signal and producing a transmitter output representative of the measured pressure;
   a hydraulic passageway for providing a communication channel between the process fluid and the sensor;
   a capillary extending from the hydraulic passageway; and
   wherein the fill tube extends from within the capillary to outside of the capillary and the collar is positioned on the portion of the fill tube outside the hydraulic passageway.

18. The crimping system of claim 1 and further comprising:
   a capillary tube for connecting to an industrial process transmitter at a first end;
   a remote seal for connecting to a second end of the capillary tube, the remote seal comprising:
      an isolation diaphragm for contacting a process fluid; and
      a pocket positioned between the isolation diaphragm and the second end of the capillary tube to form a diaphragm recess; and
   wherein a first end of the fill tube is fluidly linked with the pocket and a second end of the fill tube extends out of the capillary passageway such that the collar is positioned on the second end of the fill tube.

* * * * *